May 20, 1941.  C. H. ANDERSON  2,242,500
MANIFOLD ARRANGEMENT
Filed Feb. 26, 1940
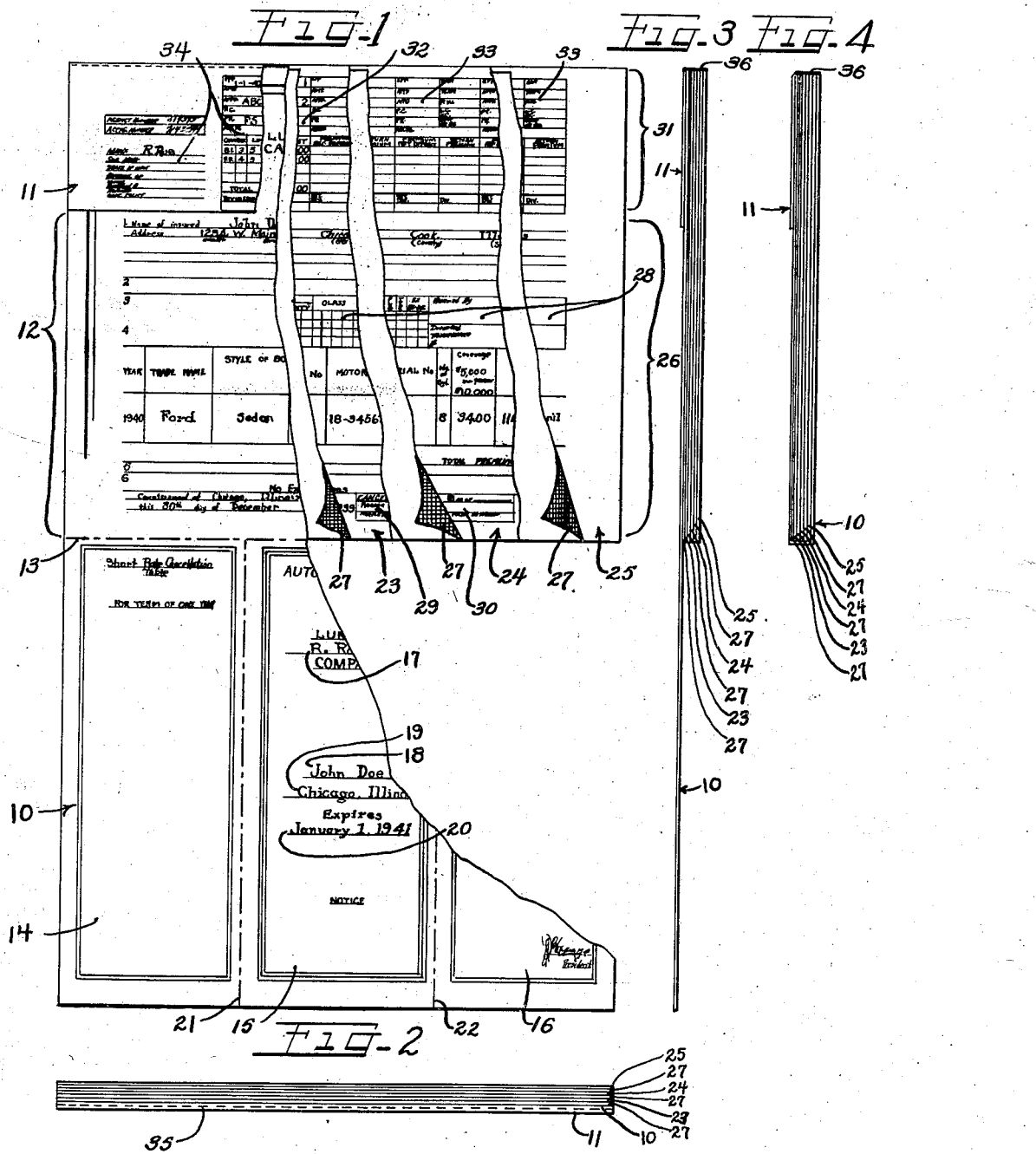
Inventor
Carl H. Anderson Patented May 20, 1941

2,242,500

UNITED STATES PATENT OFFICE 2,242,500

MANIFOLD ARRANGEMENT

Carl H. Anderson, Chicago, Ill., assignor to Lumbermens Mutual Casualty Company, Chicago, Ill., a corporation of Illinois Application February 26, 1940, Serial No. 320,869

7 Claims. (Cl. 282—9)

This invention relates to manifold arrangements or assemblies of sheets of writing paper and carbon paper for producing a plurality of copies in one operation. More particularly this invention relates to insurance policies and other forms which are generally filled out at the same time as the policy, the matter to be written on the other forms being in part identical with that written on the policy and in part different therefrom.

In filling out some forms of insurance policies, such as automobile insurance policies for example, it is necessary to prepare copies of the information written in on the policy for the home office of the insurance company, the branch office of the insurance company, and for the agent. In addition to the information contained upon the policy itself, the copies mentioned above must also have other information, such as the name of the agent and bookkeeping information, which is not to appear upon the original policy. It is also customary for the policy to be arranged so that it can be folded to a size of approximately 3½ x 8½ inches with the name and address of the policyholder and the expiration date appearing on the outside of the folded policy. Since insurance policies are generally folded so that the portion bearing the insurance policy is on the inside, the name of the policyholder and the other information which is to appear on the outside of the folded policy must be written on that portion of the policy as well as in the appropriate place in the contract portion of the policy.

It has hitherto been the practice to provide blank insurance policies and copies of the policies in sets interleaved with sheets of carbon paper so that the information which is to appear on both the policy itself and on the copies can be written simultaneously upon the policy and the copies. After this information has been written, it has hitherto been necessary to separate the policy from the copies and to then write upon the copies the information which is not to appear on the policy and to write the name and address of the insured and the expiration date of the insurance upon that portion of the policy which is to form the outside of it when it is folded. Since the writing of an insurance policy is generally done on a typewriter, these operations require three separate insertions of sheets of paper into the typewriter, two of these insertions being of sheets interleaved with carbon paper, all of which must be kept straight and in registry.

The principal object of the present invention is to provide an insurance policy and copies of the policy arranged in such a manner as to enable all of the information referred to above to be written upon them with only one insertion of paper into the typewriter.

Another object of the present invention is to provide an arrangement of insurance policy and copies with sheets of carbon paper interleaved therewith, the policy and copies being secured together and folded in such a manner as to retain the sheets of carbon paper in place without it being necessary to hold the sheets of carbon paper by adhesive or other similar means.

In accordance with the principal features of this invention, there is provided a blank insurance policy and a plurality of copies of the portion of the policy which is to be filled out according to the particular contract being written, and the policy and the copies are secured together along one edge and interleaved with carbon paper. In addition the policy is provided with a detachable flap upon which may be written the information which it is desired to place upon the copies of the policy but not upon the policy itself, the flap on the policy overlapping a portion of the policy where nothing is to be written regarding the particular contract to be embodied in the policy.

Other objects and features of the present invention will appear from the following detailed description and the accompanying claims, the description referring to the accompanying drawing, in which:

Figure 1 is a plan view of one of the preferred forms of the invention, the upper sheets of which are torn away in order to show the underlying sheets;

Figure 2 is an edge view of the form of the invention shown in Figure 1 as seen from the top;

Figure 3 is an edge view of the form of the invention shown in Figures 1 and 2, as seen from the side; and Figure 4 is a view similar to Figure 3, of the form of the invention shown in Figures 1, 2 and 3 as folded before being used, the invention as about to be used being shown in Figures 1, 2 and 3.

The particular form of the invention shown in the drawing is an automobile insurance policy having three copies, one copy being for the home office of the insurance company, one copy being for the branch office, and the third copy being for the agent. The insurance policy 10 is formed of a single sheet of paper ten inches wide and a little less than twenty inches long, one end of the sheet being folded over to form a flap 11 and the remainder of the sheet, seventeen inches in length, forming the entire policy. These particular dimensions, of course, form no part of the invention itself and are given merely by way of example.

The policy 10 is printed on both sides, the insurance contract itself being on the underside of the policy not shown in the drawing, and the portion of the policy to be filled in being on the upper side. This arrangement of the policy is accomplished by writing all of the details of the individual insurance contract, such as the name of the insured, the description of the particular automobile to which the insurance applies, and the amount of the insurance, in the form of "declarations" which are referred to in the insurance contract itself.

As shown in Figure 1, the declarations numbered 1 to 6 on the policy, are all located in the area 12 on the upper side of the policy above the center 13 and below the flap 11. The lower half of the upper side of the policy is divided into three panels, 14, 15 and 16, the central panel 15 bearing the name 17 of the insurance company and places 18, 19 and 20 for the name and address of the insured and the expiration date of the policy. The other two panels 14 and 16 may carry information of interest to the policyholder. This arrangement permits the policy 10 to be folded first along the center line 13, and then folded along lines 21 and 22 between the three panels 14, 15 and 16, so that the declarations in the space 12 are all on the inside of the folded policy, while the name 18, address 19 of the insured, and the expiration date 20 of the insurance are on the outside. It may be noted that the name 18, address 19, and expiration date 20 on the panel 15 which forms the front of the folded policy are written parallel to the writing in the declaration in the space 12 and that this permits the writing in both places to be done with one insertion of the policy into the typewriter.

Directly underneath the upper half of the policy 10, are three sheets of paper 23, 24 and 25 which are one-half of the size of the policy and whose lower portions 26 are printed with forms similar to the form for the declarations in the space 12 on the policy. Sheets of carbon paper 27 placed directly above each of the record sheets 23, 24 and 25 cause the simultaneous writing on the record sheets 23, 24 and 25 of the matter which is written in the declarations in the space 12 of the policy when the policy is being filled out. If desired, the record sheets 23, 24 and 25 may be provided with places 28, 29 and 30 for recording information, such as the date of cancellation of the policy or of a renewal of the policy, obtained after the policy is issued. These places 28, 29 and 30 may be located under printed portions of the declarations where there is nothing to be filled out in issuing the policy.

The upper portions 31 of the record sheets 23, 24 and 25 lying under the flap 11 are provided with places 32 and 33 for recording information which is not to appear upon the policy itself, or which it is desired to record at the top of the record sheets for convenience in filing and bookkeeping, and also for recording additional information which is not at hand when the policy is filled out. The flap 11 is provided with a printed form 34 similar to and directly above the portion 32 of the printed forms on the record sheets to be filled in at the same time as the policy. Thus the writing which is to be placed on the upper portions 31 of the record sheets 23, 24 and 25 can be written on the flap 11 and will be transferred to the record sheets by the carbon sheets 27, but it will not be written on or transferred to the policy 10.

The flap 11 is integral with the policy 10 but is separated from it by a row of perforations 35 along the fold between them. The record sheets 23, 24 and 25 are secured along their upper edges to the policy 10 and the flap 11 by a layer of adhesive 36 applied to their edges in the same manner as common pads of writing paper are secured together. The sheets of carbon paper 27 are interleaved with the policy 10 and the record sheets 23, 24 and 25, but terminate short of their upper edges so that they are not secured by the adhesive 36 and can be very readily removed. Before the policy is filled out, the carbon sheets are retained in place by the lower half of the policy, which is folded up in back of the carbon and record sheets, as shown in Figure 4.

When the policy is to be written or filled out, the assembly described above is picked up, and the lower half of the policy 10 unfolded from the position shown in Figure 4 to the position shown in Figures 1 and 3, and the upper end of the assembly is inserted into a typewriter and brought around into the writing position. The writing which is to appear only on the record sheets 23, 24 and 25 is then typed in on the flap 11, which is the first portion of the assembly to reach the writing position in the typewriter. Duplicates of this writing are formed on the record sheets 23, 24 and 25 by the sheets of carbon paper 27, but the policy 10 is unaffected because there is no carbon paper under the flap 11. The assembly comprising the policy, the record sheets, the flaps, and the sheets of carbon paper is then advanced in the typewriter and the declarations in the area 12 below the flap 11 on the upper half of the policy are filled in. The writing done in this area, of course, appears on the policy for it is typed directly on the face of the policy, and also appears on the record sheets underneath the policy. When this part of the policy has been filled in, the assembly is advanced still further through the typewriter until the policy is in the position for writing in the name, address, and expiration date in the panel 15 which is to form the outside of the folded policy. The writing 18, 19 and 20 on this portion of the policy is not reproduced upon the record sheets 23, 24 and 25 because they and the carbon paper 27 above them do not extend under that portion of the policy. The assembly is then removed from the typewriter, the flap 11 is torn off from the policy 10 along the row of perforations 35 and is thrown away, having served its purpose. The policy 10 and the record sheets 23, 24 and 25 are separated from each other and from the interleaved carbon paper, and the record sheets 23, 24 and 25 are ready to be filed and the policy 10 is ready to be signed and folded for delivery to the insured.

From the above it will be seen that I have provided an assembly of an insurance policy and a plurality of record sheets upon which all of the information to be placed thereon, at the time that the policy is written, can be typed in with one insertion of the assembly in a typewriter. My invention thus eliminates the need of reinserting the record sheets in the typewriter without the policy and keeping the record sheets and the carbon sheets in registry while doing this. It will therefore be seen that I have materially simplified the mechanical process involved in writing insurance and, because of this, I have also reduced the possibility of mistakes being made in filling out the forms attached to the policy.

While I have illustrated and described my invention as embodied in a particular form of insurance policy, it will be obvious that it may be adapted to other forms of insurance policies and even to records relating to matters other than insurance. My invention, therefore, includes not only what I have shown and described and constructions closely similar thereto, but any arrangement which falls within the terms of any of the following claims.

I claim as my invention:

1. A manifold set for simultaneously filling in an insurance policy and a record thereof, consisting of a blank policy having places indicated thereon for writing in the details of the particular insurance contract, said places being spaced from one edge of said policy, a record sheet detachably secured under said policy and having similarly indicated places located directly under the corresponding places on the policy and having other places indicated thereon for writing which is not to appear on said policy, said other places being located between said first places and said edge, an integral flap on and overlying said policy above said other places and having similarly indicated places located directly over said other places on said record sheet, said flap being detachably secured to and along adjacent edges of said policy and said record sheet, and a sheet of carbon paper lying between said policy and said record sheet.

2. A manifold set for simultaneously filling in an insurance policy and a plurality of records thereof, consisting of a blank policy having places indicated thereon for writing in the details of the particular insurance contracts, said places being spaced from one edge of said policy, a plurality of record sheets in superposed relation under said policy and having similarly indicated places located directly under the corresponding places on the policy and having other places indicated thereon for writing which is not to appear on said policy, said other places being located between said first places and said edge, an integral flap on and overlying said policy above said other places and having similarly indicated places located directly over said other places on said record sheets, said one edge of said policy and adjacent edges of said record sheets and flap being in flush relation and detachably secured together, and sheets of carbon paper overlying each of said record sheets.

3. A manifold set for simultaneously filling in an insurance policy and a record thereof, consisting of a blank policy having places indicated thereon for writing in the details of the particular insurance contract, said places being spaced from one edge of said policy, a record sheet lying under said policy and having similarly indicated places located directly under the corresponding places on the policy and having other places indicated thereon for writing which is not to appear on said policy, said other places being located between said first places and said edge, an integral flap on and overlying said policy above said other places and having similarly indicated places located directly over said other places on said record sheet, said flap and said record sheet extending to said edge, a layer of adhesive along said edge detachably securing said record sheet and said policy and said flap together, and a sheet of carbon paper lying between said policy and said record sheet.

4. A manifold set for simultaneously filling in an insurance policy and a record thereof, comprising a blank policy having places indicated thereon for writing in the details of the particular insurance contract, said places being on the upper half of said policy and spaced down from the upper edge thereof, a record sheet lying under said upper half of said policy and having similarly indicated places located directly under the corresponding places on the policy and having other places indicated thereon for writing which is not to appear on said policy, said other places being located between said first places and said upper edge, a flap overlying said policy above said other places and having similarly indicated places located directly over said other places on said record sheets, said flap also extending to said upper edge, means along said upper edge for detachably securing said policy and said flap and said record sheet together, and a sheet of carbon paper lying between said policy and said record sheet, the lower half of said policy being folded up under said record sheet and preventing downward sliding of said carbon sheet.

5. A manifold set for simultaneously filling in an insurance policy and a record thereof, consisting of a blank policy having places indicated thereon for writing in the details of the particular insurance contract, said places being spaced from one edge of said policy, a record sheet lying under said policy and having similarly indicated places located directly under the corresponding places on the policy and having other places indicated thereon for writing which is not to appear on said policy, said other places being located between said first places and said edge, a flap integral with said policy and joined thereto along said edge, said flap overlying said policy above said other places and having similarly indicated places located directly over said other places on said record sheet, said flap and policy being provided with perforations therebetween for facilitating removal of said flap from said policy, means for detachably securing said record sheet to said policy along said edge, and a sheet of carbon paper lying between said policy and said record sheet.

6. A manifold set for filling in a plurality of forms on a typewriter, one of said forms being destined to be a ribbon copy and another of said forms being destined to be a carbon copy and to bear writing not appearing on said ribbon copy, said manifold set consisting of a first form having places indicated thereon for the writing which is to appear both on said ribbon copy and said carbon copy, said places being spaced from one edge of said form, a second form lying under said first form and having similarly indicated places located directly under the corresponding places on said first form and having other places indicated thereon for the writing which is to appear only on said carbon copy, said other places being located between said first places and said edge, a flap overlying said first form above said other places and having similarly indicated places located directly over said other places on said second form, said forms and said flap being detachably secured together along said edge, and a sheet of carbon paper lying between said forms.

7. A manifold set for filling in a plurality of forms on a typewriter, one of said forms being destined to be a ribbon copy and another of said forms being destined to be a carbon copy and to bear writing not appearing on said ribbon copy, said manifold set comprising a first form having places indicated thereon for the writing which is to appear both on said ribbon copy and on said carbon copy, said places being spaced from one edge of said form, a second form lying under said first form and having similarly indicated places located directly under the corresponding places on said first form and having other places indicated thereon for the writing which is to appear only on said carbon copy, said other places being located between said first places and said edge, a flap detachably secured to one of said forms at said edge and overlying said first form above said other places and having similarly indicated places located directly over said other places on said second form, said forms being secured together along said edge, and a sheet of carbon paper lying between said forms.

CARL H. ANDERSON.